(12) United States Patent
Chen (10) Patent No.: US 8,475,157 B2
(45) Date of Patent: Jul. 2, 2013

(54) INJECTION NOZZLE WITH ENHANCED HEAT TRANSFER CHARACTERISTICS

(75) Inventor: Jincheng Chen, Leawood, KS (US)

(73) Assignee: R&D Tool & Engineering Co., Lee's Summit, MO (US)

( * ) Notice: Subject to any disclaimer, the term of this patent is extended or adjusted under 35 U.S.C. 154(b) by 120 days.

(21) Appl. No.: 13/013,159

(22) Filed: Jan. 25, 2011

(65) Prior Publication Data

US 2012/0187610 A1 Jul. 26, 2012

(51) Int. Cl.
*B29C 45/22* (2006.01)

(52) U.S. Cl.
USPC .................. 425/570; 425/572; 425/573

(58) Field of Classification Search
USPC ............. 425/549, 562, 563, 564, 565, 566, 425/570, 572, 573
See application file for complete search history.

(56) References Cited

U.S. PATENT DOCUMENTS

| 4,312,630 | A | 1/1982 | Travaglini |
| 5,208,052 | A | 5/1993 | Schmidt et al. |
| 5,232,710 | A * | 8/1993 | Miyazawa et al. ............ 425/130 |
| 6,164,954 | A | 12/2000 | Mortazavi et al. |
| 6,726,467 | B1 | 4/2004 | Lefebure |
| 6,945,767 | B2 | 9/2005 | Guenther et al. |
| 7,458,803 | B2 | 12/2008 | Bouti |
| 7,494,336 | B2 * | 2/2009 | Barnett ........................ 425/549 |
| 7,704,069 | B2 | 4/2010 | Chen et al. |
| 7,771,189 | B2 | 8/2010 | Chen |
| 2005/0003039 | A1 * | 1/2005 | Babin et al. ................... 425/549 |
| 2005/0281906 | A1 * | 12/2005 | Noot ............................ 425/568 |

FOREIGN PATENT DOCUMENTS

EP 1258333 B1 2/2002

* cited by examiner

*Primary Examiner* — Tim Heitbrink
(74) *Attorney, Agent, or Firm* — Hovey Williams LLP (57) ABSTRACT

An injection nozzle that can be used in an injection blow molding system without use of an external heat source comprises a two-piece structure broadly including a structural outer body for coupling the nozzle to a resin manifold and a thermally conductive insert. At least a portion of an axial length of the insert has an outer diameter that is less than an inner diameter of a coinciding coaxial portion of the outer body, such that the differences in the inner and outer diameters present an insulating air gap along at least a portion of the nozzle length. A sufficient operating temperature for hot melt resin can then be obtained without use of the external heat source.

9 Claims, 12 Drawing Sheets

INJECTION NOZZLE WITH ENHANCED HEAT TRANSFER CHARACTERISTICS

BACKGROUND

1. Field

The invention relates to injection blow molding machines and, more particularly, to improvements in heat transfer throughout a nozzle of the injection blow molding machine.

2. Discussion of the Related Art

A parison molding cavity at an injection molding station of a typical injection blow molding machine is formed in part by a pair of superimposed mold halves that split or separate along the center line of each gate opening and parison cavity. Hot melt injection nozzles have discharge tips that are seated in the gate openings. To remove a set of newly formed parisons from the mold, the upper mold halves are raised off the bottom mold halves, and the cores that carry the new parisons are then lifted and rotated out of the mold. A new set of cores is placed in the cavities of the bottom mold halves and the mold is closed, creating a diametrical sealing relationship between each nozzle tip and the wall of its gate opening and preparing the mold cavities to receive hot melt through the nozzles.

Each nozzle is coupled, at its base, with a resin manifold. Prior to performing the injection blow molding, the manifold is heated to a desired operating temperature. Hot melt is supplied to each nozzle at the nozzle's base from a resin source associated with the manifold. The resin then flows through the nozzle and to the parison mold. The resin is heated to a beginning operating temperature from the heat supplied by the manifold via thermal conduction through the nozzle base. However, the resin quickly begins to cool as it flows through the nozzle, as the nozzle progressively cools along its axial length forward of the manifold. To maintain the resin at a sufficient operating temperature along the entire length of the nozzle, prior art nozzle injection systems employ an external heat source, such as a heater or a torch. The external heat source warms the nozzle, which in turn heats the resin. Although the external heat source insures the resin stays at a sufficient operating temperature, use of the external heat source increases the cost of the injection blow molding process and is a potential source of breakage and malfunction.

Accordingly, there is a need for an injection nozzle and injection blow molding system that is operable to maintain the resin at a sufficient operating temperature along the entire length of the nozzle without use of an external heat source.

SUMMARY

Embodiments of the present invention solve the above-described problems and provide a distinct advance in the art of injection nozzles. More particularly, embodiments of the present invention provide an injection nozzle that can be used in an injection blow molding system without use of an external heat source to heat the nozzle. The injection nozzle of embodiments of the present invention is operable to receive a hot melt resin from a resin source supplied through a resin manifold. The nozzle then further supplies the resin to a mold. The nozzle is a two-piece structure broadly comprising a structural outer body for coupling the nozzle to the resin manifold and a thermally conductive insert for receipt within the outer body. At least a portion of an axial length of the insert has an outer diameter that is less than an inner diameter of a coaxial portion of the outer body, such that the difference between the inner and outer diameters presents an air gap along at least a portion of the nozzle length. The air gap serves to insulate the resin flowing through the nozzle insert and minimize heat loss along the axial length of the nozzle forward of the insulating gap. Additionally, the air gap extends almost to a forwardmost end of the nozzle tip to prevent the resin temperature from significantly decreasing at the nozzle tip. Thus, embodiments of the present invention present the insulating air gap having a forwardmost gap end and an axial distance between the nozzle tip and the forwardmost gap end that is less than 20% of a total length of the gap.

Embodiments of the present invention also remove the spud commonly found forward of the nozzle tip. Removal of the spud reduces the length the resin must travel to a cavity in the mold, which minimizes heat loss during the transition of the resin from the nozzle and to the mold. In particular, embodiments of the present invention have the nozzle tip closely spaced to a gate opening to the cavity, such that an axial distance between the nozzle tip and the gate opening is 0.0-0.01 inch.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWINGS

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
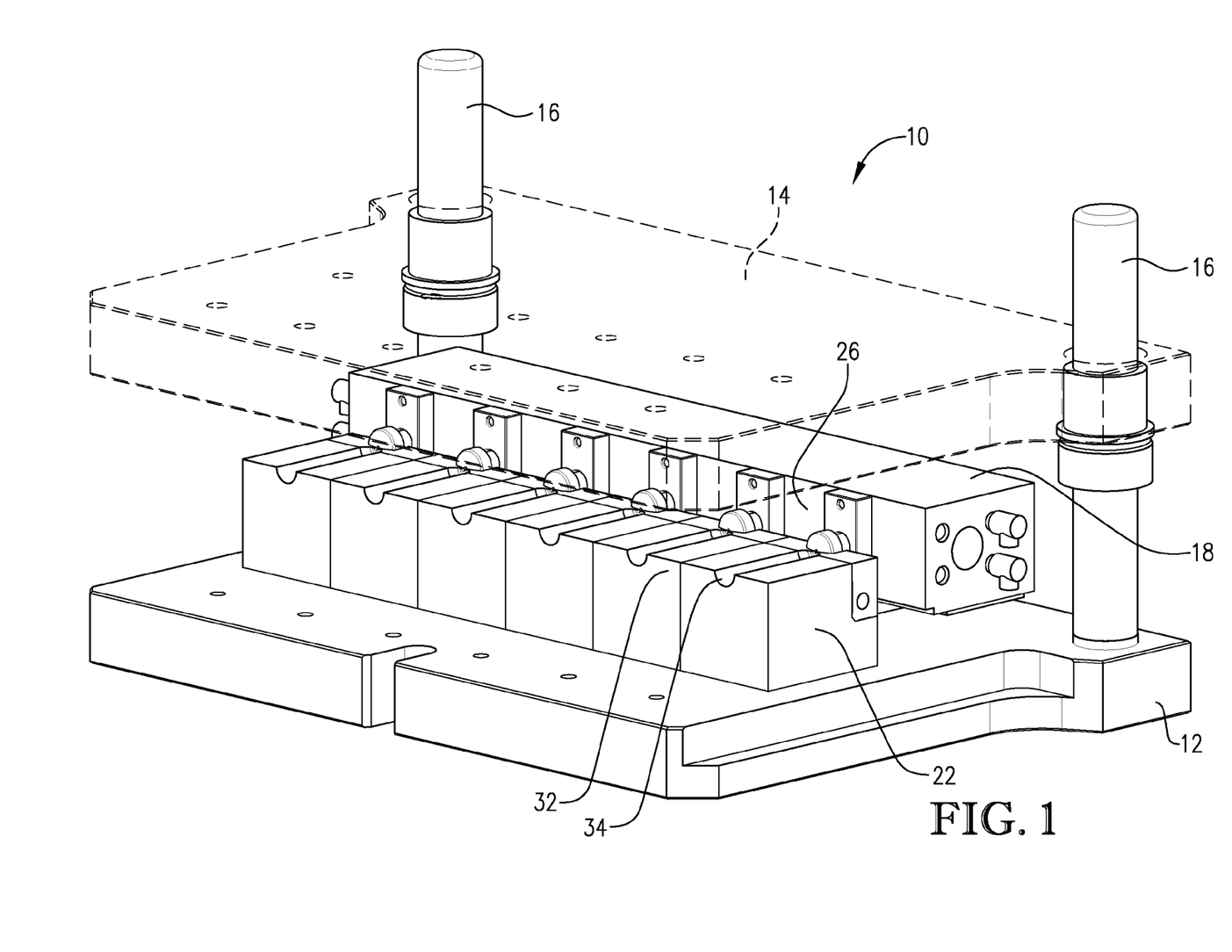
FIG. 1 is an isometric view of tooling that incorporates the principles of the present invention at the injection molding station of an injection blow molding machine, with an upper die plate being shown in phantom.
Figure 2:
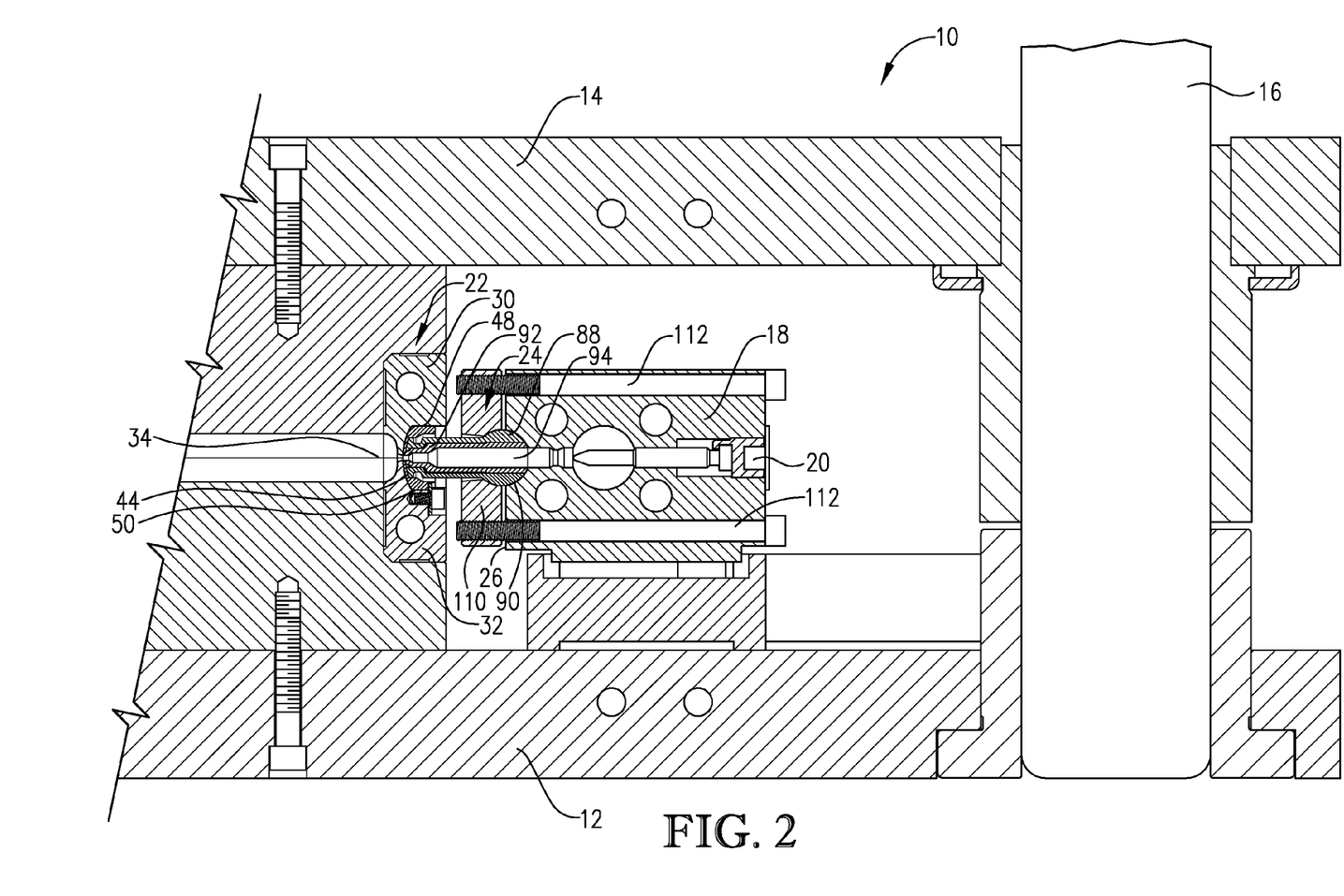
FIG. 2 is a horizontal cross-sectional view of the injection blow molding machine of FIG. 1.
Figure 3:
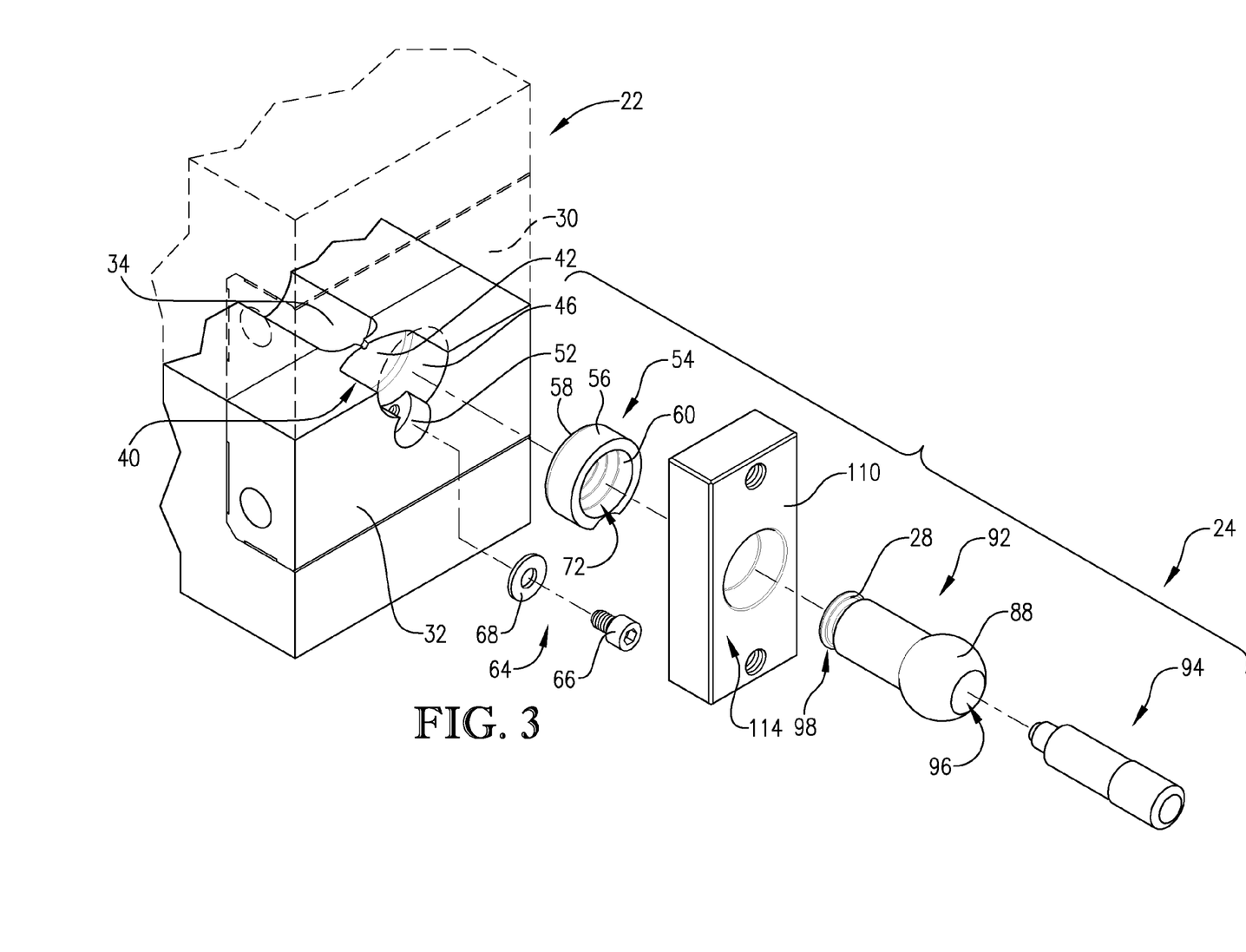
FIG. 3 is a rear exploded view of an injection nozzle for use in the injection blow molding machine of FIG. 1.
Figure 7:
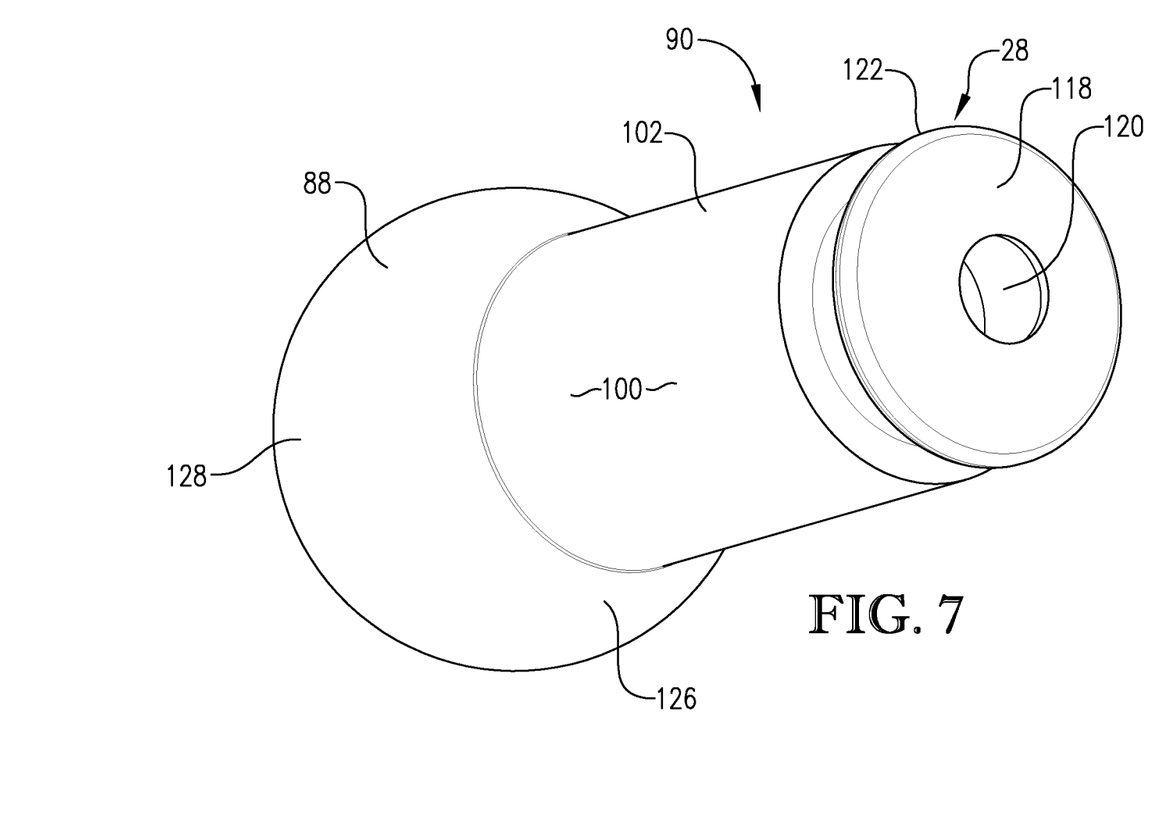
FIG. 7 is an isometric view of a structural outer body of the injection nozzle of FIG. 3.

Referring to FIGS. 1 and 2, an injection blow molding machine 10 is illustrated. The injection blow molding machine 10 generally comprises a lower plate-like die set member 12 secured to a bed of the machine (not shown); an upper plate-like die set member 14 that overlies the lower member 12 and is vertically moveable (by means not illustrated) toward and away from lower member 12 on upright guides 16; an elongated manifold block 18 secured to lower member 12 for receipt of hot molten plastic material (hereinafter "resin") from a resin source (not shown) via an inlet sprue 20 formed in or otherwise in fluid communication with manifold block 18 and disposed to receive the resin; a plurality of parison molds 22 spaced from the manifold block 18; and a plurality of injection nozzles 24 projecting forwardly from a front side 26 of the manifold block 18. Each injection nozzle 24 includes a generally convex nozzle tip 28 (see FIG. 7) for at least partial receipt in one of the respective molds 22. The resin is directed through internal passages (not shown) in manifold block 18 to the injection nozzles 24.

Manifold block 18 and its coupled nozzles 24 is moveable horizontally toward and away from the plurality of parison molds 22, each of which includes an upper mold half 30 bolted to the upper member 14 and a lower mold half 32 bolted to the lower member 12. When each mold 22 is closed, mold halves 30, 32 cooperatively form a parison cavity 34. Prior to the mold halves 30, 32 closing, an elongated core 36 is received within the cavity 34 from the opposite side of the injection blow molding machine 10. When the manifold block 18 is in its forward operating position as illustrated throughout the Figures, injection nozzles 24 are disposed for injecting hot melt into the cavities 34. When manifold block 18 is backed away from its forward position, the nozzles 24 are withdrawn from between the upper and lower mold halves 30, 32.

As best illustrated in FIGS. 4 and 11-13, each pair of mold halves 30, 32 cooperatively defines a gate opening 38 at the side of the molds 22 facing the manifold block 18. Gate opening 38 leads to cavity 34 from an enlarged void or well 40 formed in the manifold side of mold 22 when the mold is closed. Well 40 has a generally concave front end wall 42 formed by corresponding end wall surfaces 44 in upper and lower mold halves 30,32. Well 40 also includes an annular sidewall 46 that is formed by corresponding upper and lower sidewall surfaces 48,50 in the upper and lower mold halves 30, 32 when mold 22 is closed. The upper and lower sidewall surfaces 48,50 of the upper and lower mold halves 30, 32 are substantially identical to one another with the exception that the lower sidewall surface 50 includes a radially inwardly projecting notch 52 that is not present on the upper mold half 30, the purpose for which will be described in more detail below.

Figure 11:
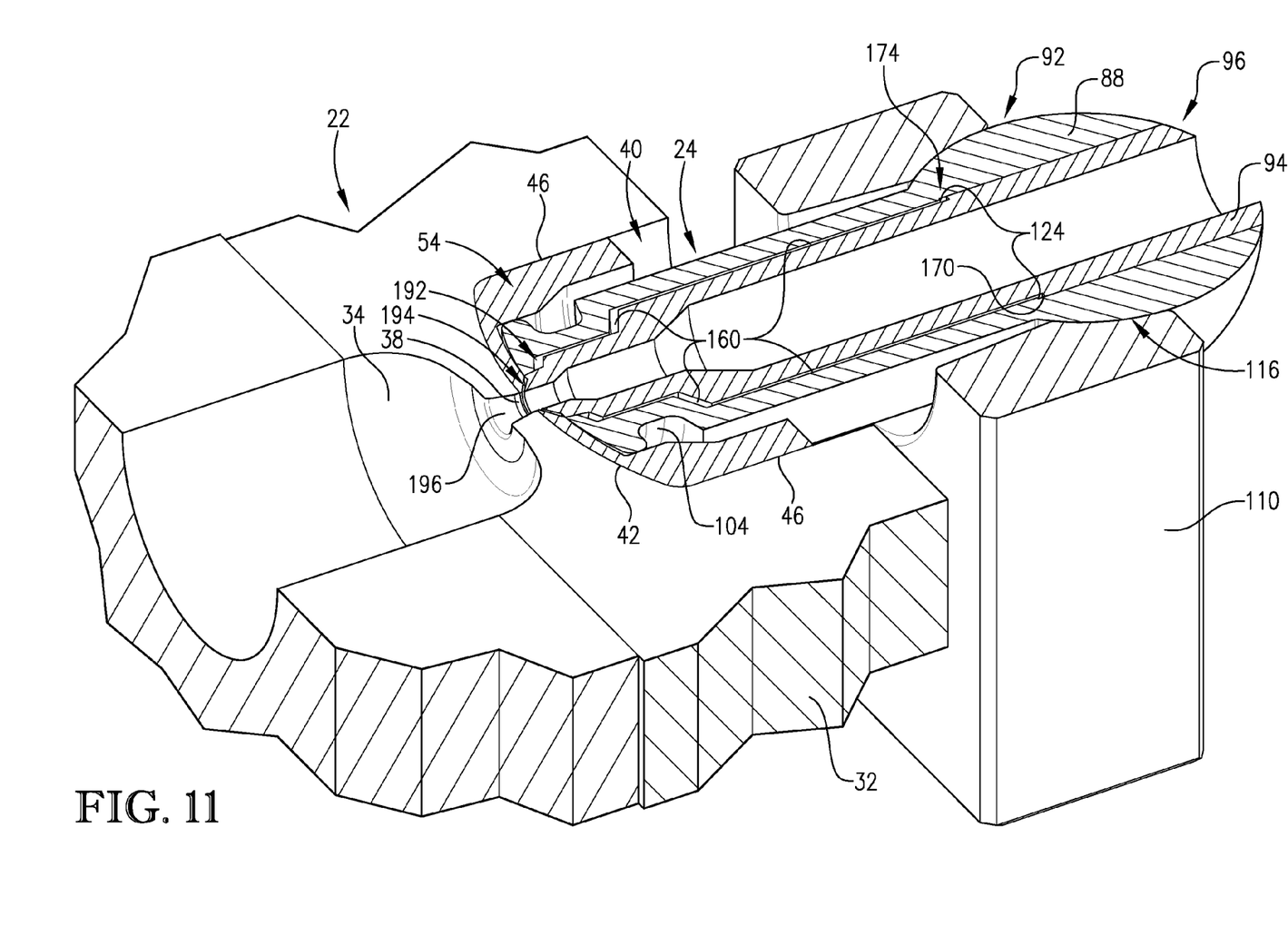
FIG. 11 is an isometric, horizontal cross-sectional view of the injection nozzle and insert cup and particularly illustrating the nozzle insert housed within the nozzle structural outer body.
Figure 12:
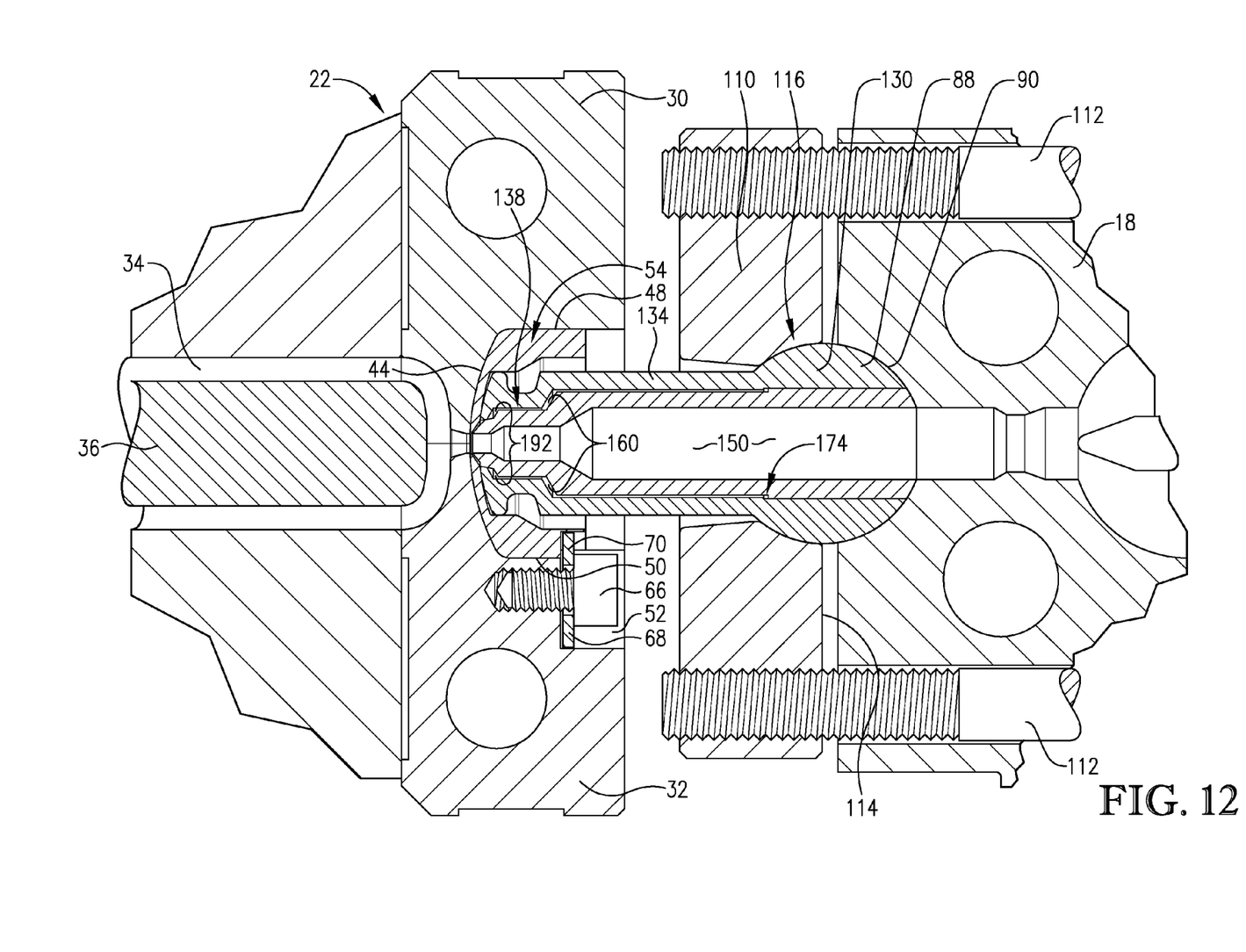
FIG. 12 is a top plan view of the horizontal cross-sectional view of FIG. 11 and particularly illustrating the nozzle.
Figure 13:
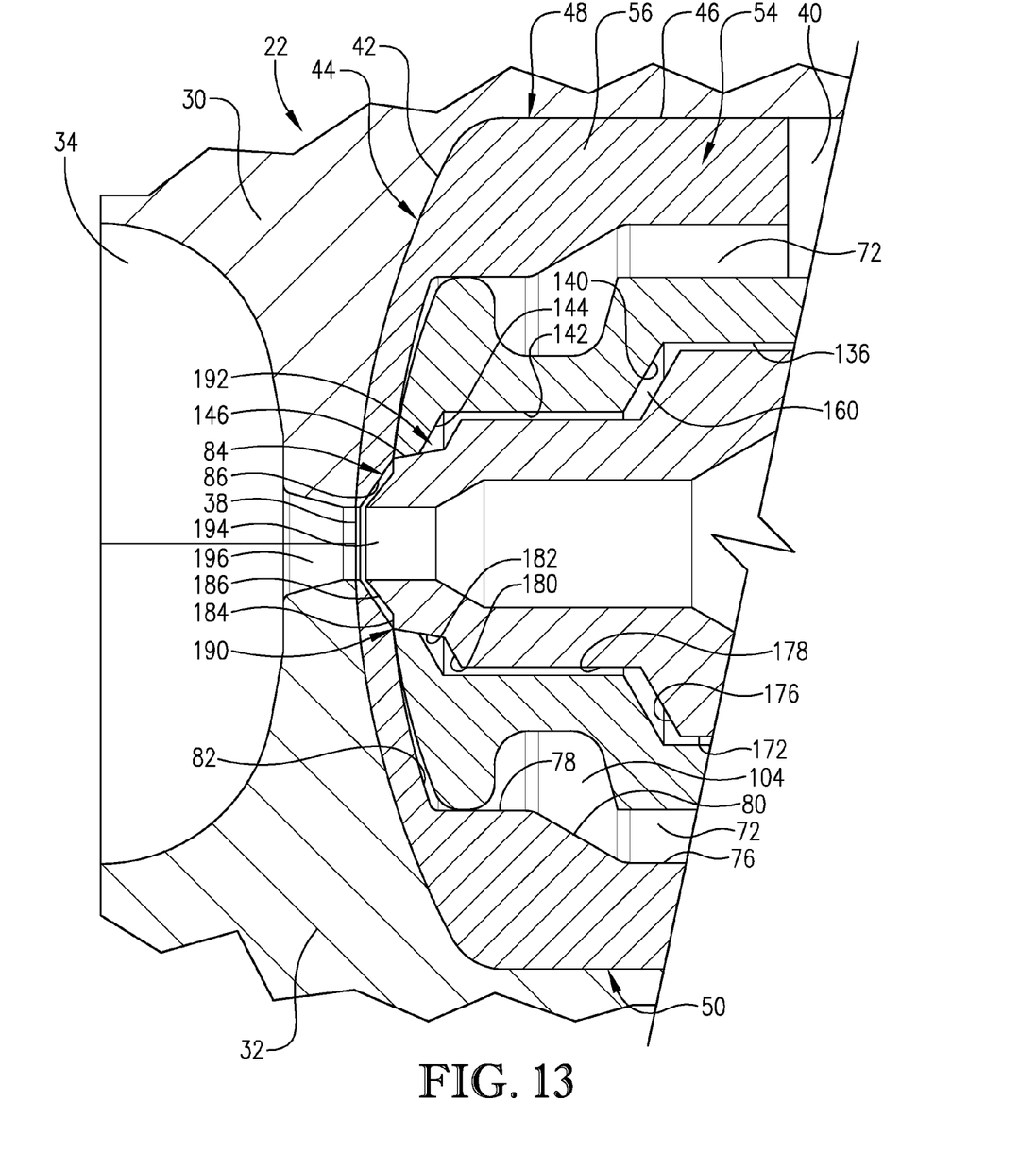
FIG. 13 is a fragmentary, detailed view from FIG. 12 of the nozzle tip and a gate opening to a cavity mold.
Figure 14:
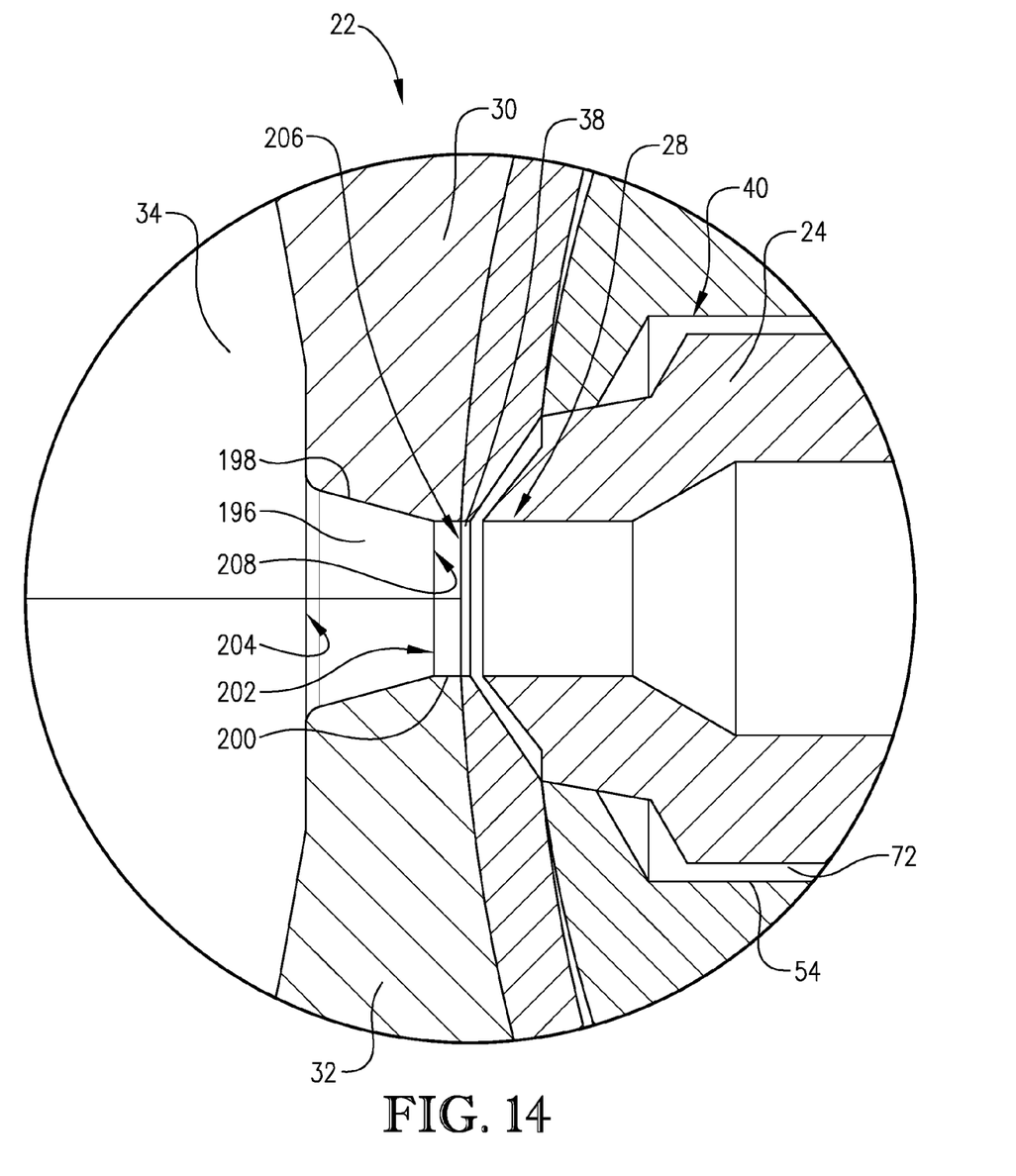
FIG. 14 is a fragmentary, detailed view from FIG. 13 of the gate opening, a cavity gate, and the cavity mold.

Referring to FIGS. 11-13, each lower mold half 32 has attached thereto a nozzle-receiving insert cup 54 that occupies the well 40 when the mold 22 is closed. Each insert cup 54 is tubular and hollow and has a generally cylindrical body 56 presenting front and rear ends 58,60. The body 56 corresponds in configuration with the annular sidewall 46 of well 40 and is only slightly smaller in diameter than sidewall 46 to adapt insert cup 54 to be snugly received within well 40. Front end 58 of body 56 presents a slightly convexly curved outer front face 62 that matches the curvature of front end wall 42 of well 40 so that front face 62 directly abuts end wall 42 when insert cup 54 is disposed within well 40. A radius of curvature of the convex front face 62 of the insert cup 54 is at least 0.5 inch, and may be approximately 1 inch. Thus, the insert cup 54 is sized to fit within the well 40, such that the insert cup 54 has a diametrical fit with the surrounding annular sidewall 46 and end wall 42 of well 40 when mold 22 is closed.

Figure 5:
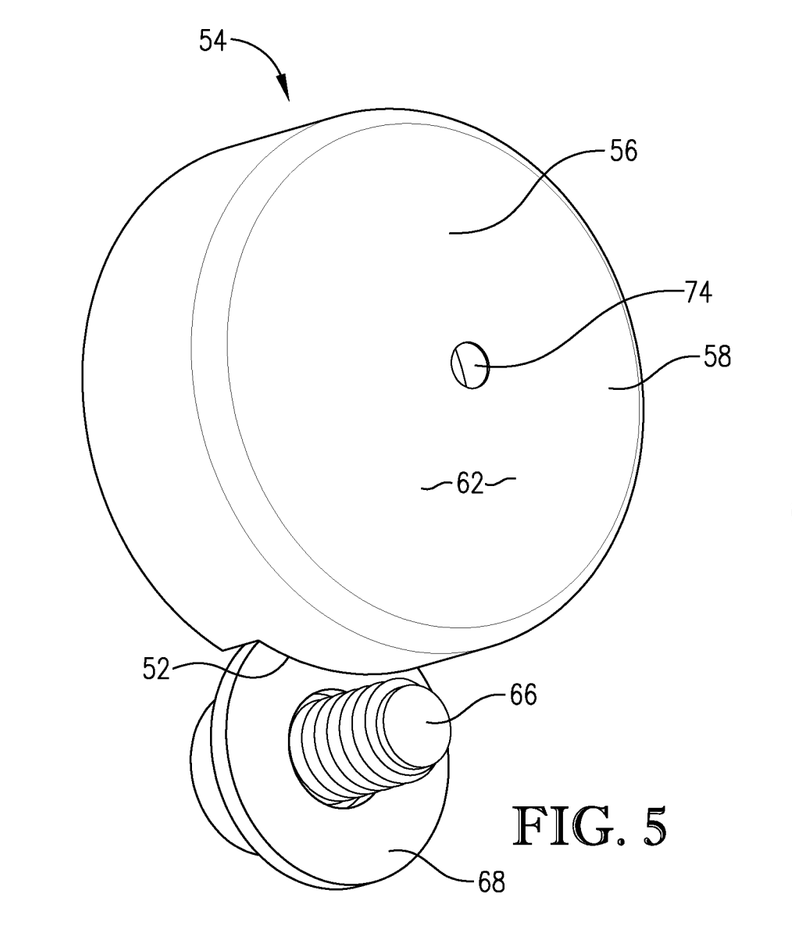
FIG. 5 is a front isometric view of an insert cup for receipt of a tip of the injection nozzle.
Figure 6:
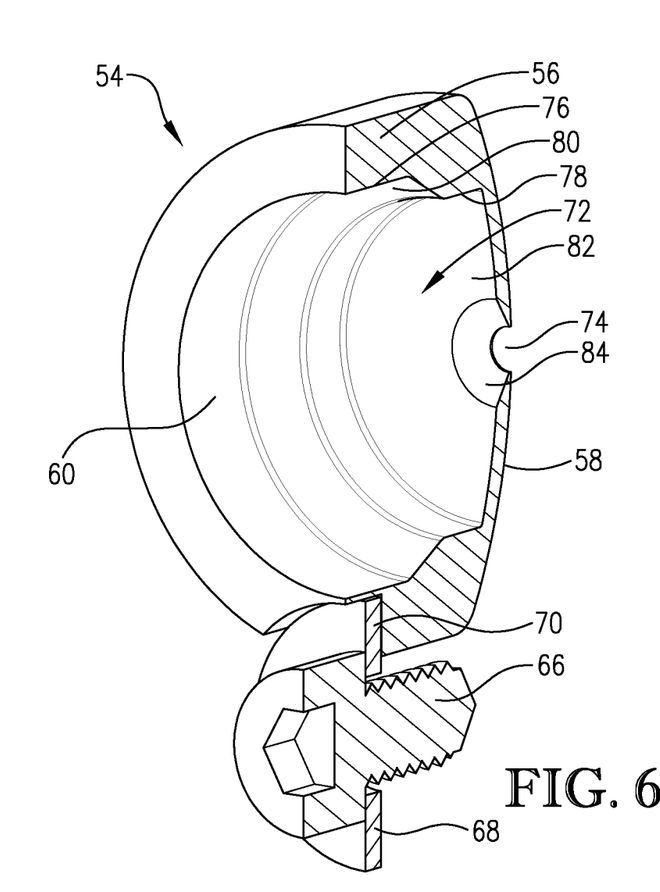
FIG. 6 is a rear, vertical cross-sectional view of the insert cup of FIG. 5 and particularly illustrating a receiving chamber for the nozzle tip.

Each insert cup 54 is held against rotation within the well 40 by its own keeper 64 comprising a bolt 66 and a washer 68, as illustrated in FIGS. 5-6 and 12. A peripheral portion 70 of each washer 68 projects laterally into well 40 and is disposed to be received within the notch 52 in the well 40, as described above. The bolt 66 and washer 68 act as a stop to prevent outward axial dislodgement of insert cup 54 from mold 22 and rotation of the cup 54 within well 40.

Figure 4:
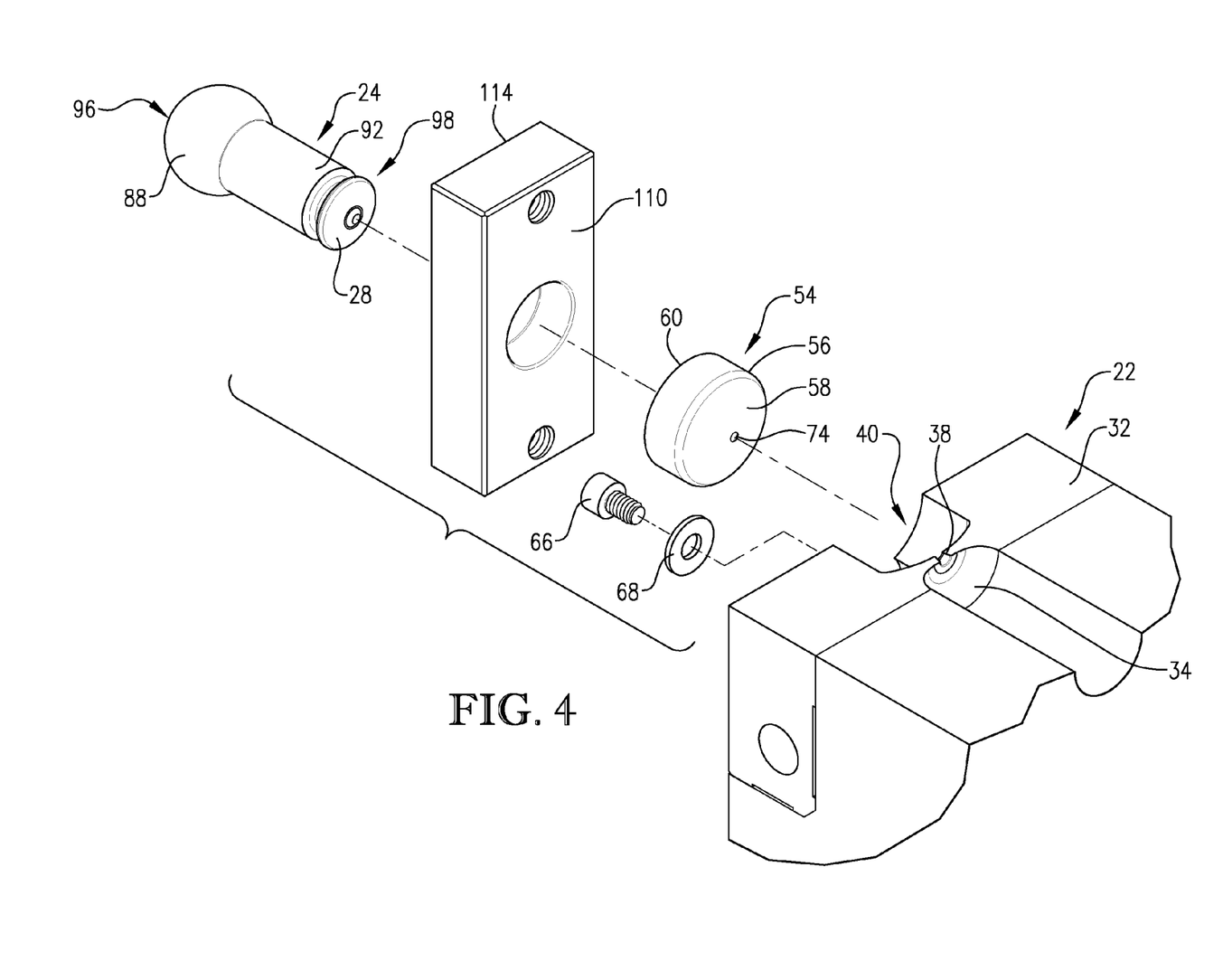
FIG. 4 is a front exploded view of the injection nozzle of FIG. 3.

Insert cup 54 includes a generally cylindrical receiving chamber 72 defined in the interior of body 56, as illustrated in FIG. 6. The receiving chamber 72 extends axially inwardly from the rear end 60 of body, which is open, to the front end 58 of the body 56, which includes an opening 74 in fluid communication with the gate opening 38, as best illustrated by comparing FIGS. 4 and 6. As illustrated in FIG. 4, the opening 74 at the front end 58 of body 56 is of a significantly smaller diameter than the open rear end 60 of body 56. Preferably, the opening 74 at the front end 58 is approximately the same diameter as the gate opening 38.

Figure 8:
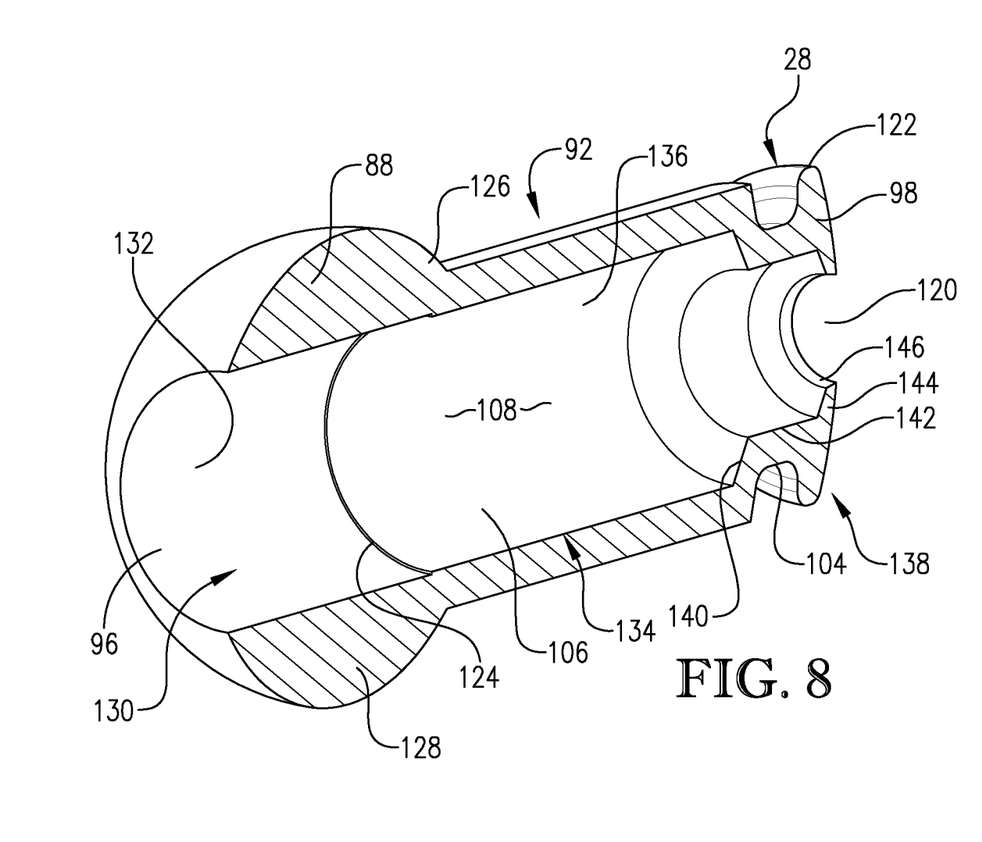
FIG. 8 is a vertical cross-sectional view of the structural outer body of the injection nozzle of FIG. 7 and particularly illustrating an interior of the outer body.
Figures 9, 10:
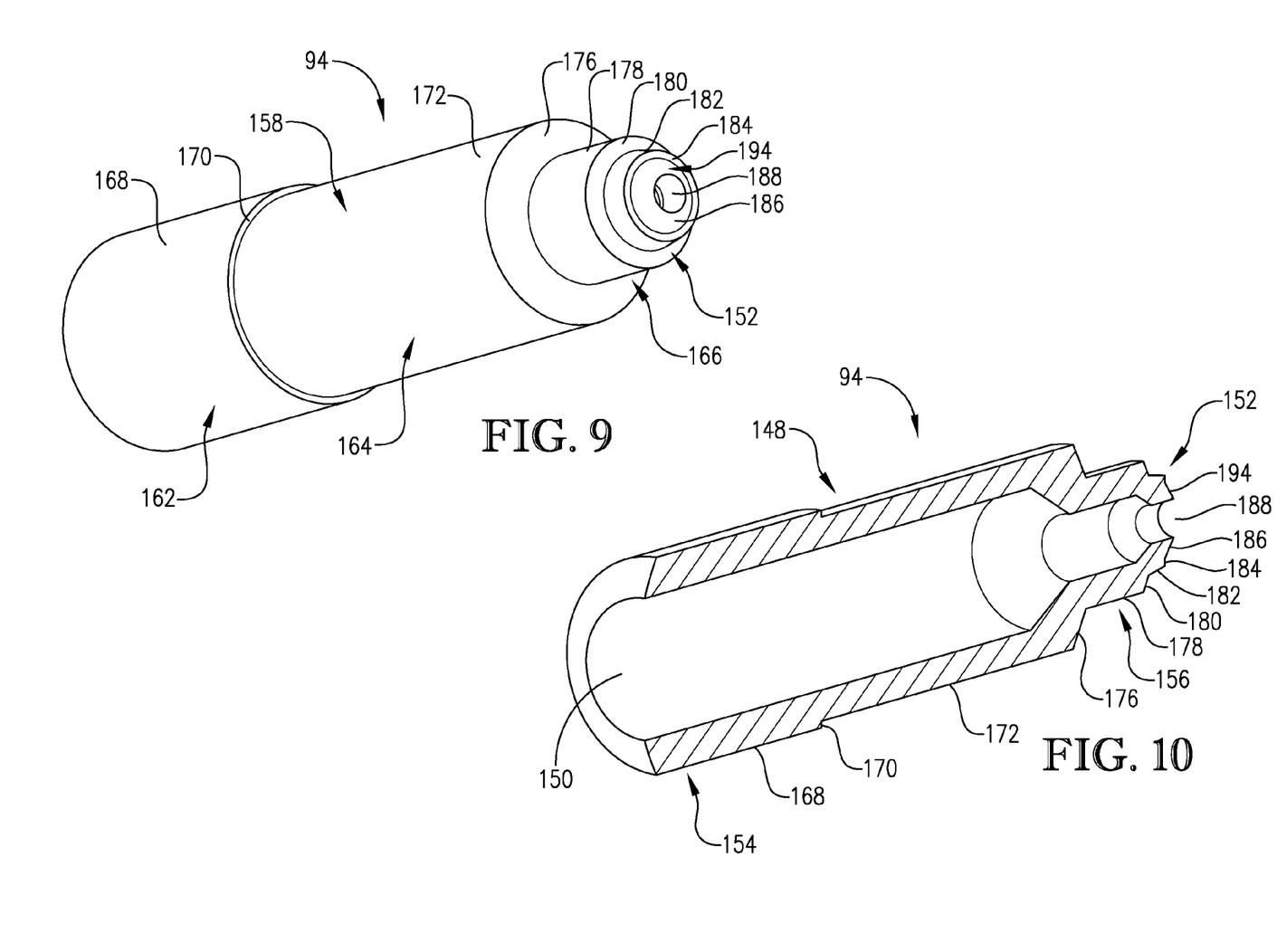
FIG. 9 is an isometric view of an insert for receipt in the outer body of the injection nozzle of FIGS. 3 and 7.
FIG. 10 is a vertical cross-sectional view of the insert of the injection nozzle of FIG. 3.

Referring to FIGS. 6, 8, and 13, the receiving chamber 72 defined in the insert cup 54 has a relatively large diameter clearance sidewall 76 closest to rear end 60, a relatively smaller diameter locating sidewall 78 closest to front end 58, and a first forwardly tapering guiding sidewall 80 intermediate the clearance and locating sidewalls 76,78. Locating sidewall 78 is disposed at the radially outer extremity of a rearwardly facing front end wall 82 in chamber 72. When the nozzle 24 is in its operating position, the nozzle tip 28 is sized to contact the front end wall 82 and locating sidewall 78 of the receiving chamber 72.

Front end wall 82 is generally concave (with respect to its rearwardly oriented face) but includes a forwardly extending protuberance 84. In particular, front end wall 82 surrounds, at a general diametrical center of said end wall 82, a second forwardly tapering sidewall 86 extending from the front end wall 82 towards the front end 58 of the insert cup 54. The second tapering sidewall 86 defines the above-discussed opening 74 at the front end 58 of the insert cup 54 that leads directly to the gate opening 38.

In embodiments of the invention, insert cup 54 is constructed from 420 stainless steel, while mold halves 30,32 are constructed from P20 hardened steel. In such embodiments, insert cup 54 thus has a lower thermal conductivity than mold 30,32. In alternative embodiments of the present invention, insert cup 54 and mold halves 30,32 are both formed of stainless steel, such that the cup 54 and mold halves 30,32 have approximately the same thermal conductivity.

Referring now to FIGS. 3-4 and 7-10, the injection nozzle 24 is illustrated. Each of the injection nozzles 24 mounted in the manifold block 18 is substantially similar. Although only six injection nozzles are illustrated as mounted in the manifold block 18, it should be appreciated that fewer or more nozzles could be mounted in the manifold block 18. Preferably, each nozzle 24 has a generally spherical base 88 that is received by a concave swivel seat 90 in the manifold block 18, as illustrated in the Figures and as described in U.S. Pat. No. 7,704,069, which is assigned to the assignee of the present application and which is hereby incorporated by reference in its entirety into the present application. For ease of reference, certain features of the invention described in the '069 Patent will also be set forth herein.

The nozzle 24 of embodiments of the present invention comprises a hollow, structural outer body 92 and a thermally conductive insert 94 at least partially, and in preferable embodiments, completely received in the structural outer body 92. The structural outer body 92 is configured for coupling the nozzle 24 with the manifold block 18. In embodiments of the present invention, the structural outer body 92 is preferably formed of H-13 tool steel hardened to approximately 54-56 Rc and has a thermal conductivity of approximately 15 BTU/fthr/° F. and a maximum yield strength of 204,000 psi.

The nozzle 24 has a rear end 96 and a forward or front end 98, and the outer body 92 has an exterior surface 100 presenting the spherical base 88 at the rear end 96 of the nozzle 24, an elongated shank 102 disposed between the rear and forward ends 96,98, the nozzle tip 28 at the forward end 98, and a continuous, circumferential groove 104 disposed between the shank 102 and the tip 28. The outer body 92 further includes an axially extending hollow 106 presenting an interior surface 108. The outer body 92 is retained in its seat by a retainer block 110 that is bolted against the front side 26 of manifold block 18 by a pair of long bolts 112. A back side 114 of retainer block 110 has a concave face 116 that overlies the spherical base 88 of the outer body 92 so as to permit nozzle 24 to swivel to a certain extent as may become necessary during molding operations.

The exterior surface 100 of the outer body 92 at the nozzle tip 28 has a forwardly facing end face 118 (FIG. 7) provided with a diametrically centered opening 120 for receipt of a portion of the insert 94 therethrough, as described in more detail below. The end face 118 of the outer body 92 at the nozzle tip 28 slopes rearwardly to thereby render the end face 118 generally convex (with respect to its exterior surface). In embodiments of the present invention, the radius of curvature of end face 118 shares the same center point as the radius of curvature of spherical base 88.

At the radial outermost edge 122 of the nozzle tip 28 (FIG. 8), the tip 28 begins to curve inwardly towards the circumferential groove 104, such that the radial outermost edge 122 serves as a locating edge for positioning of the nozzle 24 in the insert cup 54. During use, the outermost edge 122 contacts the locating sidewall 78 formed in the receiving chamber of cup 54 to assist in aligning and retaining the nozzle 24 in the cup 54.

The interior surface 108 of the outer body 92 surrounds the hollow 106 that receives the insert 94, as described in more detail below. The interior surface 108 presents a variety of annular sidewalls of varying diameters to accommodate the insert 94 and to assist in obtaining the enhanced thermal properties of the present invention. Referring to FIGS. 8, 12, and 13 and moving from the rear end 96 of the nozzle 24 to the forward end 98, the outer body 92 includes an inwardly extending annular shelf 124 of less than 0.020 inch or less than 0.015 inch. The shelf 124 is axially located along the length of the outer body 92 at a location coinciding with a portion of the spherical base 88 of the nozzle 24. Thus, if a lateral line was to be drawn across the shelf 124 and to the exterior 100 of the outer body 92, the lateral line would intersect at least a portion of the spherical base 88. In embodiments of the present invention, the shelf 124 is axially located along the length of the outer body 92 at a general forward end 126 of the spherical base 88. In even further embodiments of the present invention, the shelf 124 is axially located along the length of the outer body 92 at a location where the outer body 92 has a temperature that is at least 70%, at least 80%, or at least 90% of the temperature of the spherical base 88 at a rearward end 128 directly proximate the manifold block 18, and the heat for the temperature at the forward end 126 of the base 88 is supplied by the manifold block 18.

The shelf 124 divides the interior surface 108 of the outer body 92 into a first axial section 130 having a first annular sidewall 132 with a first inner diameter and a second axial section 134 having a second annular sidewall 136 with a second inner diameter. The second inner diameter is less than the first diameter, and in embodiments of the present invention the second inner diameter is 0.010-0.050 inch less than the first inner diameter, and may be approximately 0.020 inch less than the first inner diameter. The second axial section 134 of the interior surface 108 extends along a majority of a length of the shank 102 of the outer body 92, and in preferred embodiments of the present invention, the second axial section 134 of the interior surface 108 extends along at least 70%, at least 80%, or at least 90% of the length of the shank 102. The second axial section 134 begins at approximately one-third a length of the nozzle 24 when measured from the nozzle's rear end 96 at the base 88 to the nozzle's forward end 98 at the nozzle tip 28.

As best illustrated in FIGS. 8 and 13, the interior surface 108 of the outer body 92 also presents a third axial section 138 generally divided into a plurality of successively decreasing diameters so as to present a generally inwardly tapering third section 138 as the forward end 98 of the nozzle 24 is approached. In particular, the third section 138 includes a first forwardly tapering annular sidewall 140 extending inwardly from a forwardmost edge of the second annular sidewall 136. A third annular sidewall 142 that is generally straight extends from a forwardmost edge of the first tapering annular sidewall 140. A second forwardly tapering annular sidewall 144 extends inwardly from a forwardmost edge of the third annular sidewall 142, such that the second tapering annular sidewall 144 has a smaller inner diameter than the first tapering annular sidewall 140. An annular locating sidewall 146 extends from a forwardmost edge of the second tapering sidewall 144 and surrounds the opening 120 in the forward end face 118 of the nozzle 24, such that a radial outermost edge of the locating sidewall 146 defines the opening 120. As discussed in more detail below, the insert 94 is held at least partially in place within the hollow 106 of the outer body 92 via contact with the annular locating sidewall 146. A length of the locating sidewall 146 can be 0.020-0.040 inch, and may be approximately 0.031 inch.

The third annular sidewall 142 is axially located along the length of the outer body 92 at a location coinciding with the circumferential groove 104 about the exterior 100 of the outer body 92. The second tapering sidewall 144 and locating sidewall 146 are axially located along the length of the outer body 92 immediately rearwardly of the end face 118 of the nozzle tip 28.

In embodiments of the present invention, the structural outer body 92 progressively loses heat as the forward end 98 of the nozzle 24 is approached. At the rearward end 128 of the base 88, the outer body 92 is in direct contact with the manifold block 18, where the heat from the block 18 is thermally transmitted or conducted to the rearward end 128 of the base 88. At the rearward end 128, the resin that flows through the nozzle 24 is of a sufficiently heated operating temperature. However, as the resin progressively moves along the axial length of the nozzle 24, the resin is farther away from the heat source, namely the manifold block 18. Thus, the temperature of the outer body 92 progressively decreases along its axial length as the nozzle tip 28 is approached. To insure that the resin remains at a sufficient operating temperature for the injection blow molding process, embodiments of the present invention employ the insert 94.

Referring now to FIGS. 9-13, the insert 94 has a generally tubular, cylindrical body 148 that is press fit within the hollow 106 of the structural outer body 92. The insert 94 is hollowed to include a passageway 150 through which resin flows towards the nozzle tip 28. The insert 94 is preferably made of a highly thermally conductive material, such as a metal or metal alloy. An exemplary alloy is the AMPCOLOY® 940, provided by Ampco Metal SA, having a thermal conductivity of approximately 120 BTU/fthr/° F. and a maximum yield strength of approximately 64,000 psi. Thus, a ratio of the thermal conductivity of the insert 94 to the structural outer body 92 is greater than 2:1, greater than 4:1, or greater than 6:1, and a ratio of the strength of the structural outer body 92 to the insert 94 is greater than 2:1, greater than 3:1, or greater than 4:1.

A length of the insert 94 and of the structural outer body 92 are approximately the same, such that the insert 94 extends along at least 80%, at least 90%, or at least 95% of the length of the structural outer body 92. In embodiments of the present invention, the insert's length is actually greater than the length of the outer body 92 due to a tip 152 of the insert 94 extending beyond the end face 118 of the outer body 92, as described below. It is to be appreciated that the insert 94 could be shorter than the outer body 92 to the extent that the highly thermally conductive insert 94 was of a sufficient length to receive the heat from the manifold block 18 through the outer body 92.

The insert 94 has a rear end 154, a forward end 156, and an exterior surface 158 of varying diameters, such that when the insert 94 is press fit within the hollow 106 of the structural outer body 92, an insulating air gap 160 is created. As best illustrated in FIGS. 9-13, the insert 94 of embodiments of the present invention is illustrated as being generally divided into first, second, and third sections 162,164,166. The first section 162 has a first annular sidewall 168 about the exterior surface 158 of the insert 94 at the general rear end 154 of the insert 94.

The first annular sidewall 168 has a first outer diameter that is slightly smaller than the first inner diameter of the first annular sidewall 132 of the interior surface 108 of the structural outer body 92, such that the insert 94 can be at least partially held within the structural outer body 92 via the press fit engagement between the first annular sidewalls 132,168 of the outer body 92 and insert 94, respectively. The interior surface 108 of the body 92 and the exterior surface 158 of the insert 94 are in direct contact along approximately 33% of the axial length of the nozzle 24 and over 95% of the axial length of the outer body 92 coinciding with the first section 130 of the body 92.

The first and second sections 162,164 of the exterior surface 158 of the insert 94 are divided by an inwardly extending annular shelf 170 that is slightly larger in width that the shelf 124 provided on the interior surface 108 of the outer body 92. A second annular sidewall 172 extends axially forwardly from the shelf 170 of the insert 94. The second sidewall 172 has a second outer diameter that is less than the first outer diameter of the first annular sidewall 168 of the insert 94 and is also less than the second inner diameter of the second annular sidewall 136 of the body 92. Because of the differences in diameter between the second inner diameter of the body 92 and the second outer diameter of the insert 94, the small annular gap 160 is created along the axial length of the insert 94 corresponding to the second section 164. The gap 160 can be 0.005-0.015 inch in width, and may be approximately 0.010 inch in width. A width of the gap 160 is preferably not more than 0.020 inch at any point along its length.

Referring to FIG. 12, the shelf 170 formed on the insert 94 is preferably immediately axially rearward of the shelf 124 on the interior 108 of the structural outer body 92 when the insert 94 is located in the outer body 92. Thus, the width of the air gap 160 at a rearmost end 174 is approximately 0.015 inch and narrows to the above-discussed 0.010 inch width immediately forward of the outer body shelf 124.

It is to be appreciated that instead of the outer body 92 and insert 94 both including inwardly extending shelves 124,170, the differences in the inner diameter of the outer body 92 and the outer diameter of the insert 94 at the second sections 134,164 could be accomplished via other structure. For example, the outer body shelf 124 could extend outwardly toward the exterior 100 of the outer structural body 92 (as opposed to inwardly as described). In such a case, the outer diameter of the insert 94 along the first and second axial sections 162,164 would remain approximately the same, whereas the inner diameter of the outer body 92 along the second axial section 134 would increase. In both embodiments, however, the second axial section 164 of the insert 94 has the outer diameter that is less than the inner diameter of the coaxial second section 134 of the outer body 92 so as to present the insulating air gap 160 between the coaxial sections 134,164 of the insert 94 and outer body 92.

As best illustrated in FIG. 13, the exterior surface 158 of the insert 94, similar to the interior surface 108 of the outer body 92, also presents the third section 166 at the general forward end 156 of insert 94. The third section 166 is generally divided into a plurality of successively decreasing diameters so as to present a generally inwardly tapering third section as the forward end 156 of the insert 94 is approached. In particular, the third section 166 includes a first forwardly tapering annular sidewall 176 extending inwardly from a forwardmost edge of the second annular sidewall 172. A third annular sidewall 178 that is generally straight extends from a forwardmost edge of the first tapering annular sidewall 176. A second forwardly tapering annular sidewall 180 extends inwardly from a forwardmost edge of the third annular sidewall 178, such that the second tapering annular sidewall 180 has a smaller inner diameter than the first tapering annular sidewall 176. A first annular contacting sidewall 182 extends from a forwardmost edge of the second tapering sidewall 180. The insert 94 is held at least partially in place within the hollow 106 of the outer body 92 by at least a portion of the first contacting sidewall 182 of the insert 94 abutting against the locating sidewall 146 of the outer body 92.

The tip 152 of the nozzle insert 94 protrudes beyond the end face 118 of the structural outer body 92 when the insert 94 is housed within outer body 92. Referring to FIG. 13, the insert 94 includes a second, generally horizontal annular contacting sidewall 184 that extends from a forwardmost edge of the first contacting sidewall 182. A third forwardly tapering annular sidewall 186 extends from a forwardmost edge of the second contacting sidewall 184 and defines an opening 188 at the forwardmost end of the insert tip 152. The opening 188 defines the forward end of the passageway 150 through which the resin flows in the nozzle 24.

When the insert 94 is housed within the outer body 92 and the nozzle 24 is positioned within the insert cup 54, a relatively small portion of the second contacting wall 184 abuts against the interior front end wall 82 of cup 54 at a contact point 190, as best illustrated in FIG. 13. This contact point 190 has a length of less than 0.009 inch, and may be less than or equal to 0.005 inch. Although the contact point length is relatively very small, the contact point 190 assists in aligning and holding the nozzle 24 in position within the manifold block 18.

As illustrated in FIG. 12, the various walls of the interior surface 108 of the structural outer body 92 and of the exterior surface 158 of the insert 94 are respectively coaxial. In particular, the first sidewall 168 of the insert 94 is generally coaxial with the first sidewall 132 of the outer body 92, and as noted above, the outer diameter of the first sidewall 168 of the insert 94 is only slightly smaller than the inner diameter of the first sidewall 132 of the outer body 92 so as to create the press fit engagement between the insert 94 and outer body 92. Moving forward along the nozzle length, the second sidewall 172 of the insert 94 is generally coaxially aligned with the second sidewall 136 of the outer body 92. Due to the above-described shelves 124,170 and the outer diameter of the insert 94 being less than the inner diameter of the outer body 92, the insulating air gap 160 is created. The air gap 160 continues along almost the entire remainder of the axial length of the nozzle 24. Thus, the first tapering sidewall 176 of the insert 94 is generally coaxially aligned with the first tapering sidewall 140 of the outer body 92, and a diameter of the insert's first tapering sidewall 176 is less than a diameter of the outer body's first tapering sidewall 140. Similarly, the third annular sidewall 178 of the insert 94 is generally coaxially aligned with the third annular sidewall 142 of the outer body 92, and a diameter of the insert's third annular sidewall 178 is less than a diameter of the outer body's third annular sidewall 142.

Due to the differences in the diameters of the insert walls and the diameters of the outer body walls, the air gap 160 continues along the axial length of the nozzle 24 and to a front point of contact between the nozzle insert 94 and the outer body 92 at the nozzle tip. In particular, at the nozzle tip 28, a forwardmost edge of the second tapering sidewall 144 of the outer body 92 contacts or otherwise intersects the first contacting sidewall 182 of the insert 94. Where the outer body 92 contacts the insert 94 at the forward end 98 of the nozzle 24 defines an end 192 to the insulating gap 160. Thus, the insulating gap 160 extends along the axial length of the nozzle 24 from the general forward end 126 of the base 88 to proximate a forwardmost end 194 of the nozzle tip 28, such that the insulating air gap 160 extends along at least 40%, at least 50%, or at least 60% of the axial length of the nozzle 24. In embodiments of the present invention, the insulating gap 160 extends along approximately 66% of the axial length of the nozzle 24. Further, the insulating air gap 160 extends to the nozzle tip 28, such that an axial distance between the forwardmost end 194 of the nozzle tip 28 and the forwardmost gap end 192 is less than 40%, less than 20%, or less than 10% of the total length of the gap 160. In embodiments of the present invention, the forwardmost gap end 192 is only 0.007 inch from the forwardmost end 194 of the nozzle tip 28.

When the spherical base 88 of the nozzle 24 is located in the concave swivel seat 90 of manifold block 18, and the nozzle tip 28 is positioned within the receiving chamber 72 of cup 54, the forwardmost end 194 of nozzle tip 28 is closely spaced to the gate opening 38 in the cavity 34 of parison mold 22, as best illustrated in FIG. 13. In embodiments of the present invention, an axial distance between the forwardmost end 194 of the nozzle tip 28 and the gate opening 38 is less than 0.025 inch, less than 0.015 inch, less than 0.005 inch, or less than 0.002 inch. This close spacing between the nozzle tip 28 and the gate opening 38 minimizes heat loss between the nozzle 24 and the mold 22 to assist in maintaining the desired operating resin temperature.

To further assist in minimizing heat loss between the nozzle 24 and cavity 34, embodiments of the present invention provide a cavity gate 196 having a reduced length. Referring to FIG. 13, the cavity gate 196 is disposed between the gate opening 38 of the mold 22 and the cavity 34. The cavity gate 196 comprises a first, axially outwardly tapering annular sidewall 198 and a second, axially straight annular sidewall 200. The first sidewall 198 comprises a rear end 202 and a forward end 204, and similarly, the second sidewall 200 comprises a rear end 206 and a forward end 208. The rear end 202 of the first sidewall 198 is oriented towards the gate opening 38, and the forward end 204 of the first sidewall 198 is oriented towards the cavity 34. The second sidewall 200 is disposed intermediate the gate opening 38 and the first sidewall 198. Thus, a rearmost edge at the rear end 206 of the second sidewall 200 extends from the gate opening 38, a rearmost edge at the rear end 202 of the first sidewall 198 extends from a forwardmost edge at the forward end 208 of the second sidewall 200, and the cavity 34 extends from a forwardmost edge at the forward end 204 of the first sidewall 198. An axial length of the first sidewall 198 is less than 0.15 inch, less than 0.1 inch, less than 0.08 inch, or 0.07 inch, and an axial length of the second sidewall 200 is less than 0.05 inch, less than 0.03 inch, less than 0.02 inch, or 0.015 inch. An axial length of the cavity gate 196 is therefore less than 0.2 inch, less than 0.15 inch, less than 0.1 inch, or is 0.085 inch. An angle of the tapering first sidewall 198 with respect to the axial length is less than 80°, less than 65°, less than 55°, or is 47°.

The first sidewall 198 of the cavity gate 196 presents a first diameter at its rearmost edge adjacent the second sidewall 200 and a second diameter at its forwardmost edge adjacent the cavity 34. The first diameter is less than the second diameter. The first diameter is less than 0.2 inch, less than 0.15 inch, less than 0.1 inch, or is 0.085 inch, and the second diameter is less than 0.25 inch, less than 0.2 inch, less than 0.15 inch, or is 0.123 inch. Because the rearmost edge of the first sidewall 198 presenting the first diameter extends from the second, straight sidewall 200, the second sidewall 200 also has a diameter generally equivalent to the first diameter of the first sidewall 198. Thus, the diameter of the second sidewall 200 is less than 0.2 inch, less than 0.15 inch, less than 0.1 inch, or is 0.085 inch.

As noted above, the forwardmost end 194 of the nozzle tip 28 is closely spaced to the gate opening 38. Because the axial length of the cavity gate 196 is relatively short, the forwardmost end 194 of the nozzle tip 28 is also closely spaced to the cavity 34 of the mold 22, such that an axial distance from the forwardmost end 194 of the nozzle tip 28 to the cavity 34 is less than 0.15 inch, less than 0.13 inch, less than 0.1 inch, or is 0.095 inch.

Operation

During injection molding operations, nozzles 24 project forwardly into the chambers 72 of insert cups 54 with their convex nozzle tips 28 confined by the locating sidewall 78 of the insert cup 54. Resin is supplied from a supply passage in manifold block 18 to the passageway 150 in insert 94 of nozzle 24, emanates from nozzle tip 28, flows through gate opening 38 immediately adjacent nozzle tip 28, and enters cavity 34. At the completion of the injection cycle, upper mold half 30 lifts off lower mold half 32 with upper die set member 14, leaving behind insert cup 54 with nozzle 24 received therein. The new parison within cavity 34 on core 36 also remains behind. Core 36, with the parison thereon, is then raised and moved away from the lower mold half 32 to provide room for a new core. The new core 36 is inserted into the lower mold half 32, and upper mold half 30 is moved into operating position, whereupon the injection cycle is repeated.

As briefly described above, the rearward end 128 of the base 88 of the nozzle 24 is directly adjacent the manifold block 18. The heat from the manifold block 18 is thermally transmitted to the nozzle base 88. However, without use of the present invention, heat loss begins almost immediately forward of the portion of the nozzle 24 not directly adjacent the manifold block 18, and the heat loss becomes sufficient to adversely impact the operating temperature of the resin as the resin moves forwardly within the nozzle passageway 150.

To maintain the resin at a sufficient operating temperature without use of external heaters, such as torches, embodiments of the present invention employ the high thermally conductive insert 94 and the insulating gap 160, which is preferably filled with air. Although the thermally conductive insert 94 assists in maintaining the operating temperature of the resin, the insulating air gap 160 further assists in maintaining sufficient operating temperature. Additionally, because the insulating air gap 160 extends almost to the forwardmost end 194 of the nozzle tip 28, the sufficient operating temperature of the resin is maintained throughout the length of the nozzle 24. Further, the resin does not have an opportunity to significantly cool at the nozzle tip 28 upon entry into the mold 22 due to the closely spaced gate opening 38 and cavity 34.

Because embodiments of the present invention do not employ an external heat source to heat the nozzle 24 and, consequently, the resin, the heat that produces the resin temperature at the nozzle tip 28 originates from the heat that produces the temperature for the manifold block 18. In particular, the manifold block 18 heats the resin supplied to the nozzle 24 to a heated temperature, and the resin maintains at least 60%, at least 70%, or at least 80% of the heated temperature throughout the length of the nozzle 24. Thus, a temperature of the resin at the nozzle tip 28 is at least 60%, at least 70%, or at least 80% of a temperature of the resin at the manifold block 18, and the temperature of the resin at the nozzle tip 28 is obtained without use of an external heat source. In embodiments of the present invention, the resin has a beginning nozzle temperature supplied by the heated manifold block 18. An end nozzle temperature of the resin at the nozzle tip 28 is at least 60%, at least 70%, or at least 80% of the beginning nozzle temperature of the resin supplied by the heated manifold block 18. At least 70%, at least 80%, or at least 95% of the heat for producing the end nozzle temperature is supplied by the heated manifold block 18.

In embodiments of the present invention, the beginning nozzle temperature of the resin at the nozzle base can be 350°-560° F., 400°-510° F., or 440°-470° F. At the nozzle tip 28, the end nozzle temperature of the resin can be 275°-485° F., 325°-435° F., or 365°-395° F. Although the temperature of the resin may decrease from its beginning temperature to its end nozzle temperature, the resin is still sufficiently heated at the nozzle tip. In embodiments of the present invention, the end nozzle temperature is within 120° F., 100° F., 80° F., or 60° F. of the beginning nozzle temperature.

The inventor(s) hereby state(s) his/their intent to rely on the Doctrine of Equivalents to determine and assess the reasonably fair scope of his/their invention as pertains to any apparatus not materially departing from but outside the literal scope of the invention as set out in the following claims.

The invention claimed is:

1. A two-part injection nozzle for supplying hot resin from a resin manifold to a resin mold, said injection nozzle comprising:
    a first part comprising an elongated, structural outer body of one-piece, unitary construction having a base at a rear end of the body for establishing direct heat transfer contact with the manifold when the body is coupled with the manifold for transferring heat from the manifold to the base of the body,
    said body further having a shank projecting forwardly from the base toward the opposite front end of the body,
    said body having a hollow interior extending axially the full length of the body from a rear opening at said rear end to a front opening at the front end; and
    a second part comprising a thermally conductive, tubular insert of one-piece, unitary construction received coaxially within said hollow interior of the body and having an axially extending internal passage for delivering hot resin from the manifold through the nozzle,
    said insert having a front point of contact with the interior of the body adjacent a front discharge end of the insert to limit the depth of insertion of the insert into the body,
    said insert having a rear heat transfer portion in direct heat transfer contact with the interior of the base of the body for transferring heat from the base of the body to the insert via the heat transfer portion of the insert,
    said heat transfer portion of the insert having an exposed rear end that is disposed for direct heat transfer contact with the manifold when the body is coupled with the manifold for transferring heat from the manifold to the insert via said exposed rear end of the heat transfer portion of the insert,
    said insert further having an insulated portion that projects forwardly from the heat transfer portion,
    said insulated portion of the insert being diametrically spaced from the interior of the shank of the body to define an insulating gap that extends from the front end of the heat transfer portion of the insert to said front point of contact of the insert with the body, whereby to insulate the insulated portion of the insert against loss of heat that has been received by the heat transfer portion of the insert from the manifold through the base of the body and the exposed rear end of the heat transfer portion of the insert.

2. A two-part injection nozzle as claimed in claim 1,
    said base of the body being generally spherical and enlarged with respect to said shank of the body.

3. A two-part injection nozzle as claimed in claim 2,
said rear end of the heat transfer portion of the insert being substantially flush with the exterior surface of said base of the body.

4. A two-part injection nozzle as claimed in claim 3,
said insulating gap extending at least as far rearwardly as the intersection between the shank and base of the body.

5. A two-part injection nozzle as claimed in claim 4,
said insert being retained within said body by a press fit relationship between the exterior of the heat transfer portion of the insert and the interior of the base of the body.

6. A two-part injection nozzle as claimed in claim 1,
said insulating portion of the insert being of reduced diameter relative to said heat transfer portion of the insert.

7. A two-part injection nozzle as claimed in claim 1,
said rear end of the heat transfer portion of the insert being substantially flush with the exterior surface of said base of the body.

8. A two-part injection nozzle as claimed in claim 1,
said insulating gap extending at least as far rearwardly as the intersection between the shank and base of the body.

9. A two-part injection nozzle as claimed in claim 1,
said insert being retained within said body by a press fit relationship between the exterior of the heat transfer portion of the insert and the interior of the base of the body.

* * * * *